Figure 1:
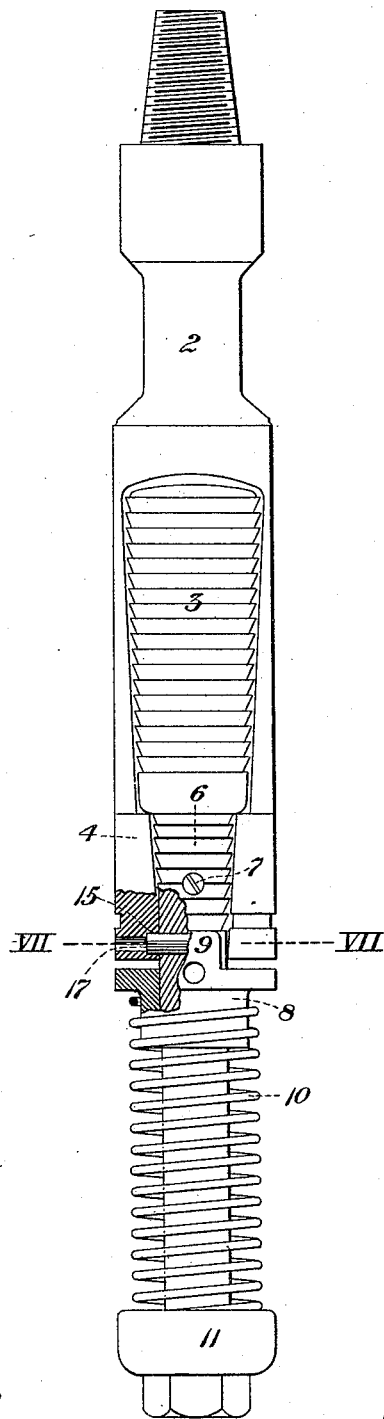

(No Model.) 3 Sheets—Sheet 1.

D. W. BLACK.
CASING SPEAR.

No. 444,061. Patented Jan. 6, 1891.

WITNESSES.
Thomas W. Barwell
W. B. Corwin

INVENTOR.
David W. Black

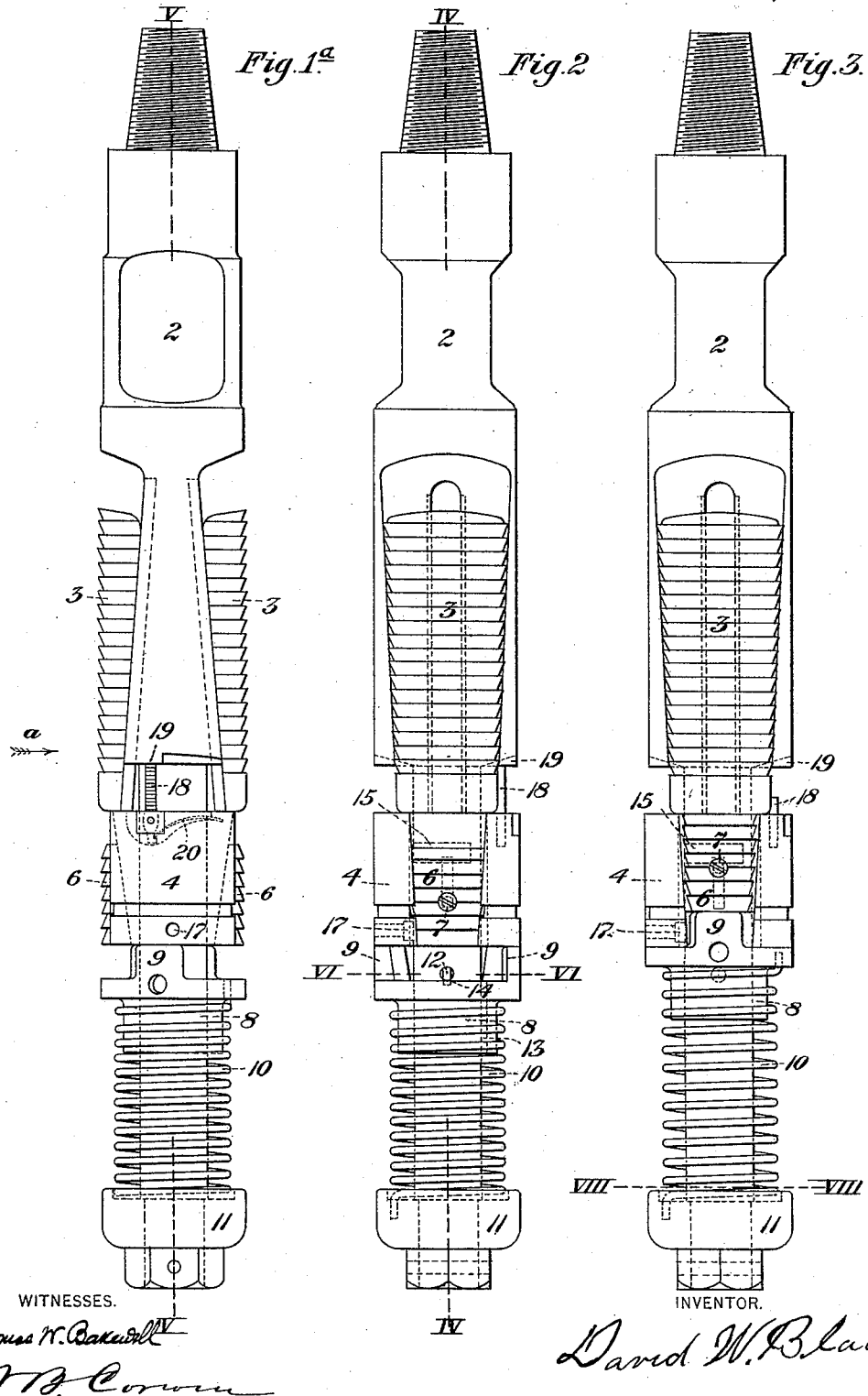

(No Model.) 3 Sheets—Sheet 3.
D. W. BLACK.
CASING SPEAR.
No. 444,061. Patented Jan. 6, 1891.
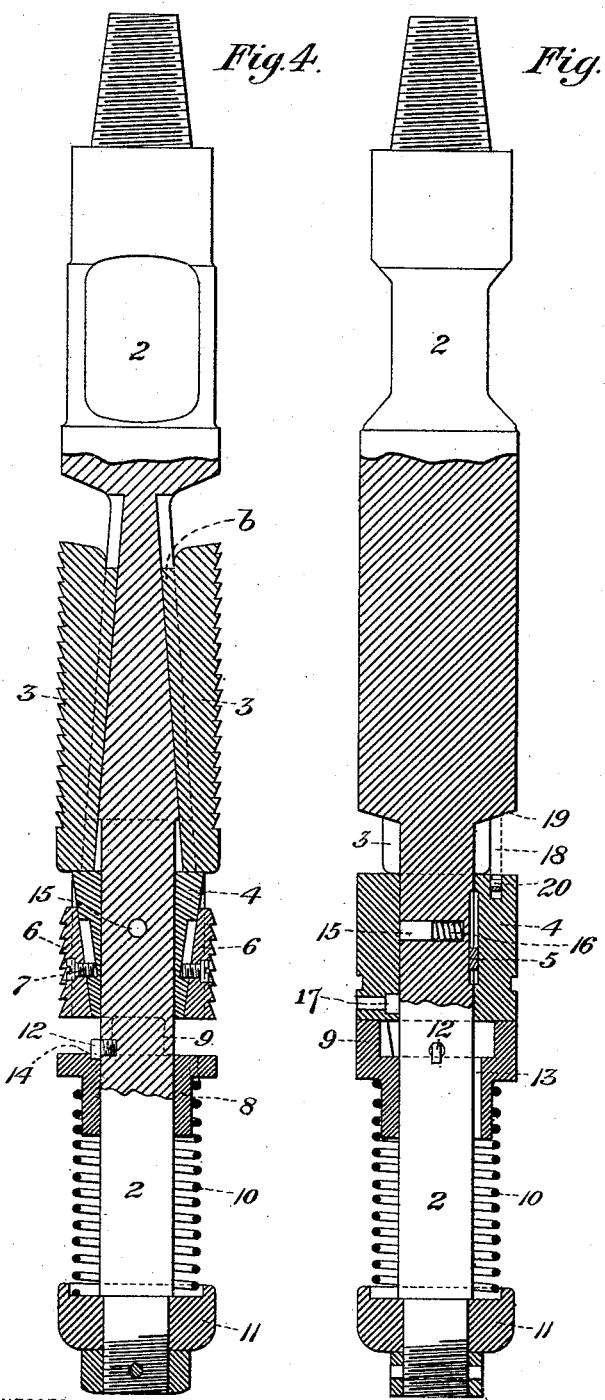
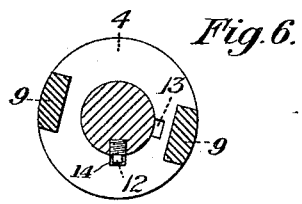
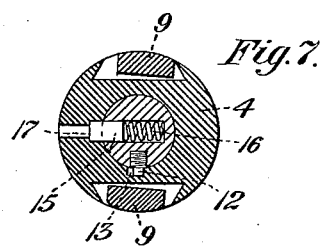
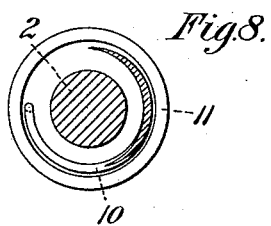
WITNESSES.
Thomas W. Bakewell
W. B. Corwin
INVENTOR.
David W. Black

UNITED STATES PATENT OFFICE.

DAVID W. BLACK, OF BUTLER, PENNSYLVANIA, ASSIGNOR TO BENJAMIN MASSETH, OF SAME PLACE.

CASING-SPEAR.

SPECIFICATION forming part of Letters Patent No. 444,061, dated January 6, 1891.

Application filed June 19, 1890. Serial No. 356,012. (No model.)

*To all whom it may concern:*

Be it known that I, DAVID W. BLACK, of Butler, in the county of Butler and State of Pennsylvania, have invented a new and useful Improvement in Casing-Spears, of which the following is a full, clear, and exact description.

A casing-spear is an implement commonly used in connection with deep wells for the purpose of removing casing from a well or for loosening it and permitting it to be shifted. The casing being packed in the well by an encircling packing device is held firmly therein, and in order to remove it, when most varieties of packers are used, it is necessary to jar on the casing until the packer is broken or torn loose before the casing can be removed. When the casing has been loosened properly from the well, the spear can be disengaged and withdrawn, and the casing can be removed without difficulty.

In the accompanying drawings which illustrate my invention, Figure 1 is a side elevation, partly in section, showing my improved casing-spear before it has been set and adapted to be let into the casing. Fig. 1ª is a side elevation of the spear, showing it set. Fig. 2 shows the spear viewed as in the direction of the arrow *a*. Fig. 3 is a view similar to Fig. 2, showing the spear when its parts have been unlocked. Fig. 4 is a longitudinal section of the spear on the line IV IV of Fig. 2. Fig. 5 is a similar section on the line V V of Fig 1ª. Fig. 6 is a horizontal cross-section on the line VI VI of Fig. 2. Fig. 7 is a horizontal cross-section on the line VII VII of Fig. 1. Fig. 8 is a horizontal cross-section on the line VIII VIII of Fig. 3.

Like symbols of reference indicate like parts in each.

In the drawings, 2 represents the stock or body of the casing-spear, the shape and relative dimensions of which are illustrated in Figs. 4 and 5.

3 3 are barbed slips or wedges, which are mounted in inclined slideways on the stock, in which they are confined by ribs *b* fitting in dovetailed grooves in said slideways. The barbs on the slips 3 are upwardly directed, so that they are adapted to bite on the casing when the spear is moved upwardly therein.

4 is a sliding tubular section mounted on the stock and guided thereon by a feather and spline 5.

6 6 are barbed slips or wedges mounted in inclined slideways on the section 4, their motion being limited by studs or screws 7, which fit in grooves on said section. The barbs on these slips are downwardly directed, so that they shall be adapted to engage the casing when the spear is moved down, as hereinafter explained.

8 is a collar movably mounted on the spear-stock below the section 4 and provided with diametrically-opposite upwardly-projecting tongues 9, which are adapted to enter the grooved seats in which the slips 6 are set.

10 is a spiral spring encircling the spear-stock, having a bearing at one end against a nut 11 and a bearing at the other end against the collar 8. The ends of the spring are secured to the nut and to the collar, respectively.

12 is a projection on the casing-stock adapted to work in a longitudinal groove 13 on the interior of the collar 8, or to engage a notch 14 situate at the upper end of the latter and distant about ninety degrees of circumference from the groove.

15 is a pin set in a hole in the spear-stock and backed by a spring 16, which tends to project it into a hole 17 in the section 4 when the parts are in the position shown in Figs. 1 and 7.

I shall now describe the manner of operation of the apparatus, beginning with the description of the spear when the parts are in the positions shown in Fig. 1, in which the slips 3, collar 8, and section 4 are raised to their full elevation, the section 4 being locked by engagement of the pin 15 in the hole 17, the pin 14 fitting in the longitudinal groove in the collar 8, and the tongues 9 fitting in the grooves of the slips 6. In order to set the spear preparatory to letting it into the casing in the well, the operator pushes down the collar 8 against the pressure of the spring 10 until the top of the collar passes below the projection 12, and the collar is then turned until the notch 14 comes opposite to and engages the projection, thus holding the collar. In this way a torsion is imparted to the spring 10, which would tend, when free, to turn the collar axially into its original position. The projection 12, groove 13, and notch 14 together constitute a catch, by which the collar is locked in position. A pin is then inserted into the hole 17, the pin 15 pushed back so as to clear the hole, and the section 4 is pushed down upon the collar 8 and is held by a trigger 18, pivotally connected to the top of the section 4, which trigger is raised into an upright position to engage a shoulder 19 on the tool-stock. A spring 20 bears on this trigger and tends to move it into a horizontal position. The depressing of the section 4 permits the slips to move down into the position shown in Figs. 1ª and 2, which illustrate the spear as it is when the parts have been adjusted in the manner just described. The spear is now ready to be let into the casing. As it is lowered at the end of a string of tools the slips 3 move up in their inclined seats and permit its easy descent. When it has been lowered to the place in the casing which it is desired to seize, the operator jars upwardly on the tools, and in such upward jarring the slips 3 bite on the casing, and by engaging at their lower ends with the section 4 hold the latter down so as to permit the shoulder 19 on the spear-stock to lift from the end of the trigger 18 and to cause the latter to drop into a horizontal position and simultaneously press down the collar 8 to disengage the notch 14 from the pin 12. The torsion of the spring 10 then turns the collar 8 so as to bring the groove 13 opposite to the projection 12 and the tongues 9 opposite to the grooves of the slips 6, and then forces the collar up on the tool-stock, so as to cause the tongues to engage these slips and to raise them on their inclined seats into operative position, so that on descent of the tool-stock they would bite on the casing. The slips 3 being now in firm engagement with the casing, further lifting or upward jarring of the spear will move the casing. When the casing has been properly loosened or sufficiently raised in the well, and it is desired to withdraw the spear therefrom, the operator jars down on the tool-stock. The effect of this is to loosen the slips 3 and to cause the slips 6 to bite on the casing and to uphold the section 4, permitting the tool-stock to move down within it until the hole 17 comes opposite the pin 15, when the latter will spring out into the hole, thus locking the parts in the original position shown in Fig. 1. The slips 3 being now held in an elevated position, the spear may be withdrawn without difficulty, and, although the slips 6 are in such operative position that if the spear should drop they would bite on the casing and uphold the spear, the spring 10 will yield so as to permit them to be forced down on their seats sufficiently to allow the spear to be withdrawn from the casing.

The advantages of my improved casing-spear will be appreciated by those skilled in the art. It is simple in construction, is easy to adjust and to operate, and is very certain in its action of gripping and releasing the casing.

I claim—

In a casing-spear, the combination, with the tool-stock, of two contrarily-acting sets of wedge-slips, a movable section by which one set of slips 6 is carried, a spring-lock adapted to hold said section in position to engage and uphold the other set of slips, a movable collar adapted to engage and project the set of slips 6, a torsion-spring by which the collar is actuated, and a lock adapted to hold the spring in a compressed and twisted condition, whereby by longitudinal motion of the tool-stock through the collar it is released and is turned and projected into engagement with the slips, substantially as and for the purposes described.

In testimony whereof I have hereunto set my hand this 17th day of June, A. D. 1890.

DAVID W. BLACK.

Witnesses:
 THOMAS W. BAKEWELL,
 W. B. CORWIN.